June 2, 1964 — T. J. DUNN — 3,135,079
MOWING APPARATUS
Filed Aug. 24, 1962 — 9 Sheets-Sheet 1

INVENTOR.
THOMAS J. DUNN
BY McMorrow, Berman & Davidson
ATTORNEYS

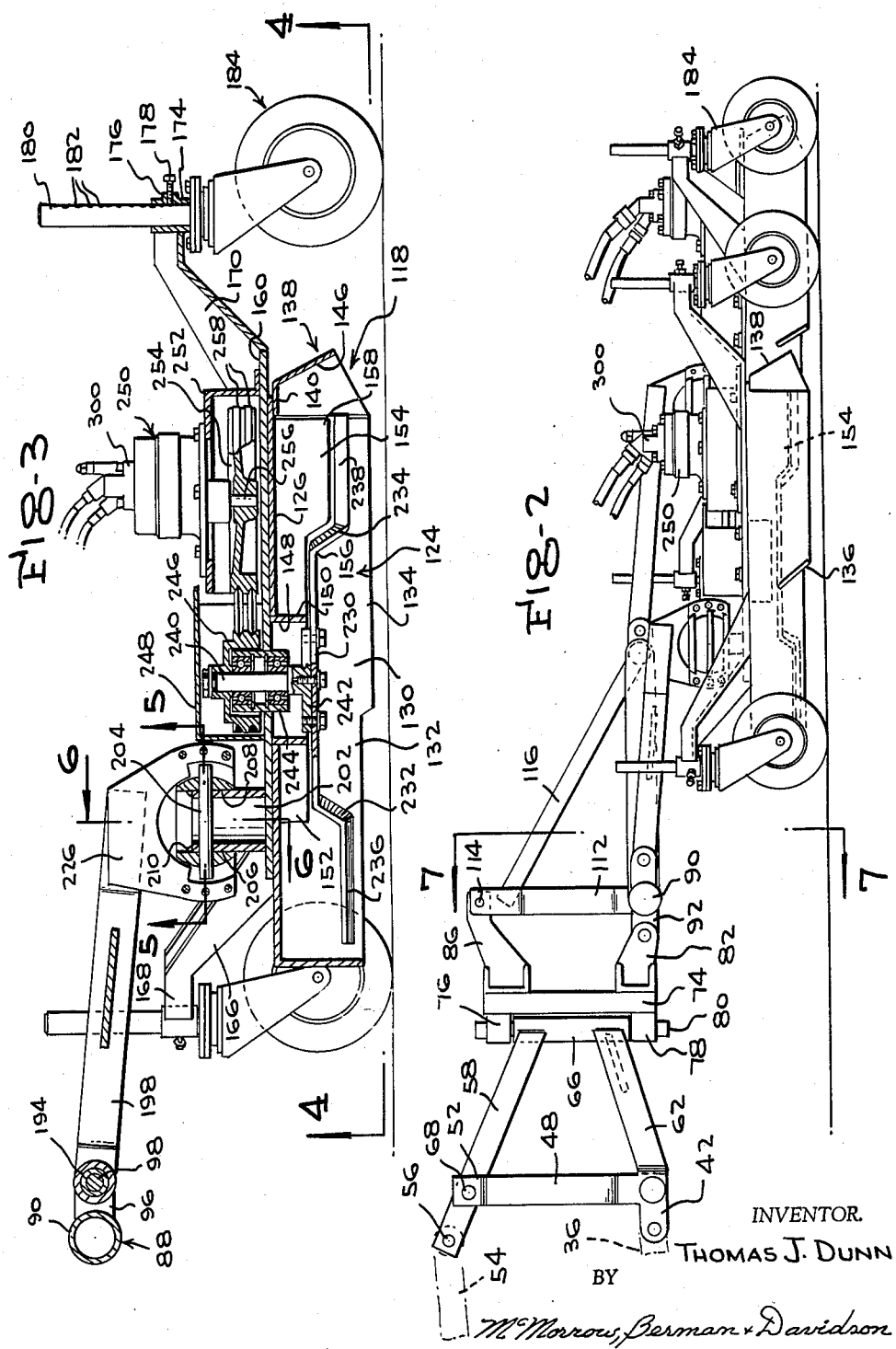

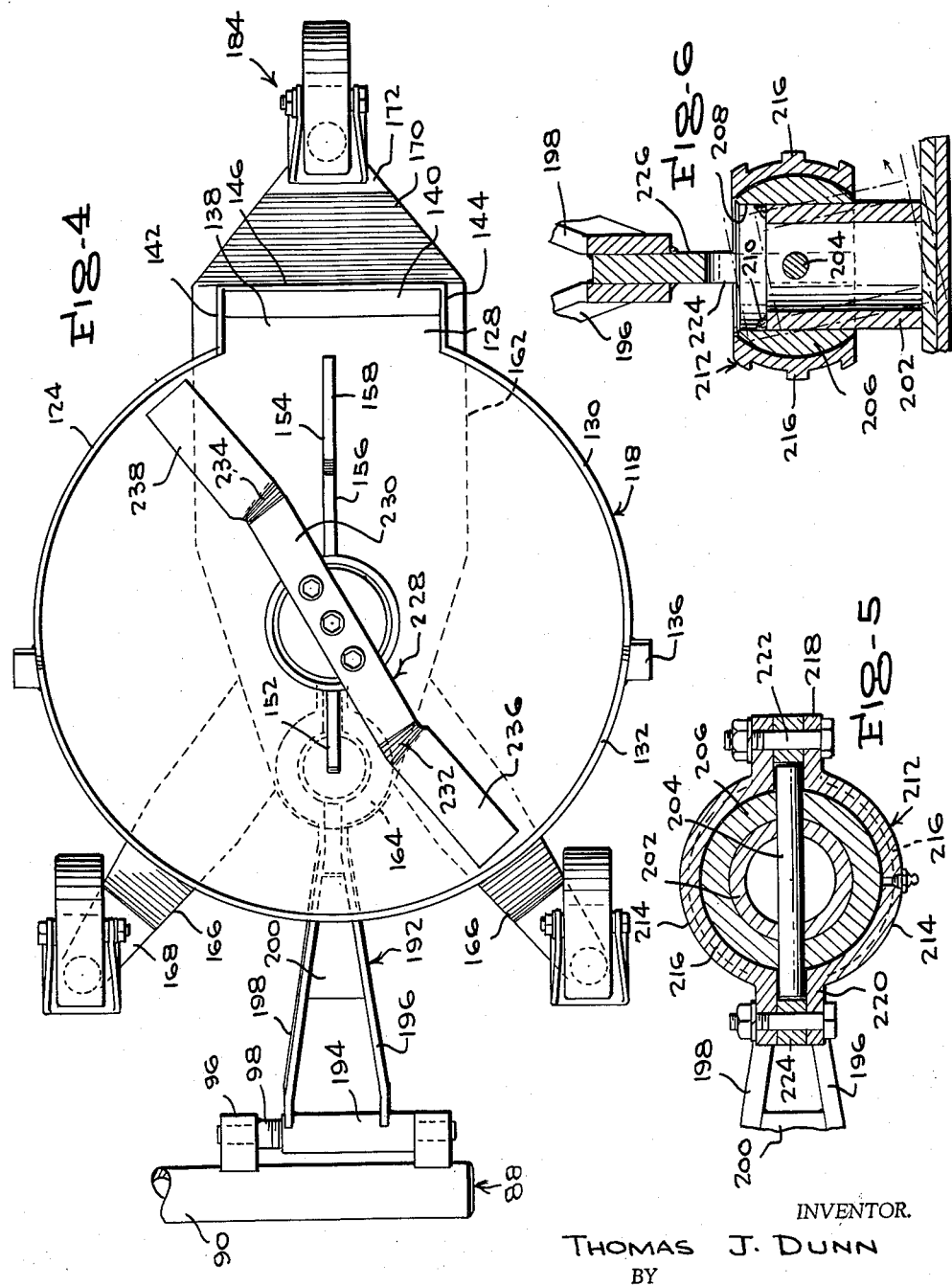

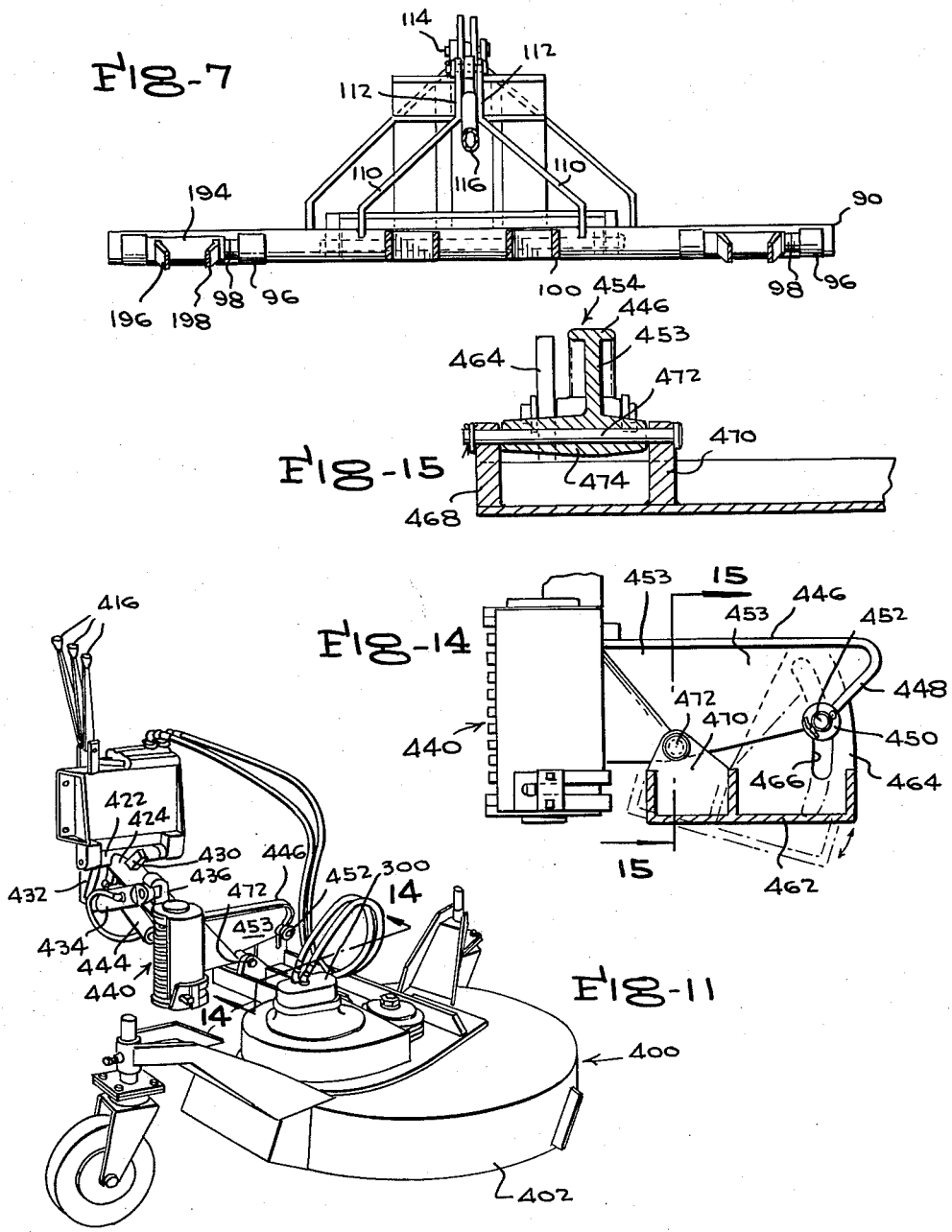

INVENTOR.
THOMAS J. DUNN

June 2, 1964  T. J. DUNN  3,135,079
MOWING APPARATUS
Filed Aug. 24, 1962  9 Sheets-Sheet 6
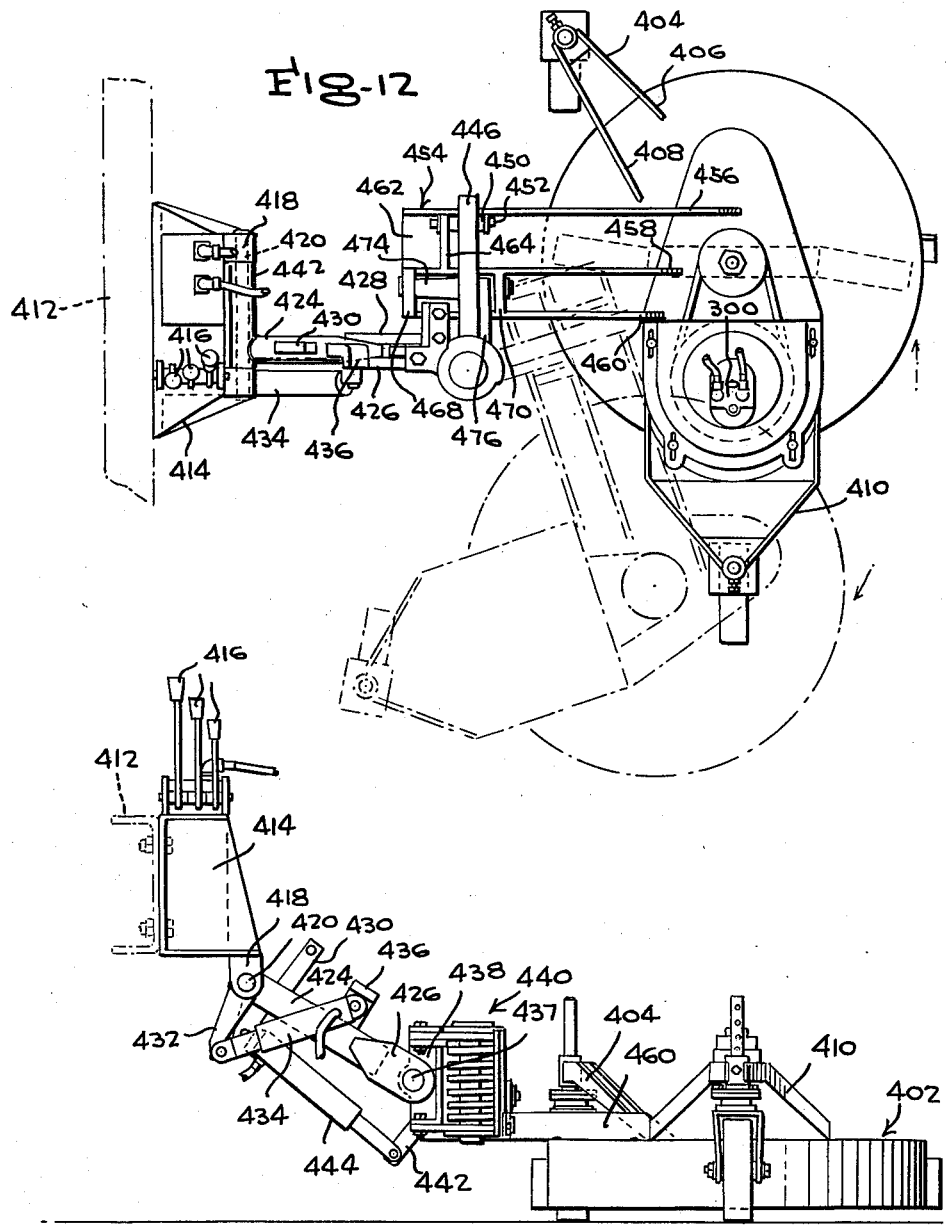
INVENTOR.
THOMAS J. DUNN
BY
McMorrow, Berman & Davidson
ATTORNEYS

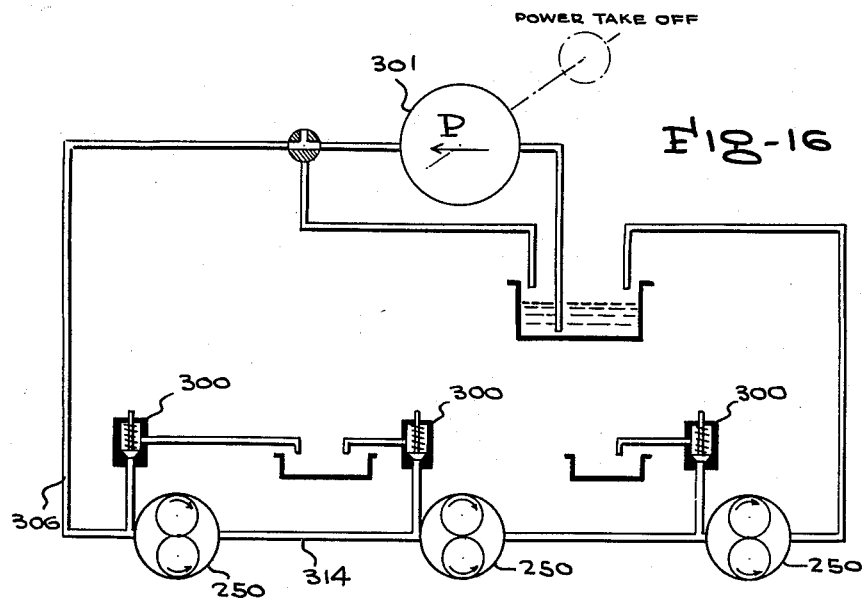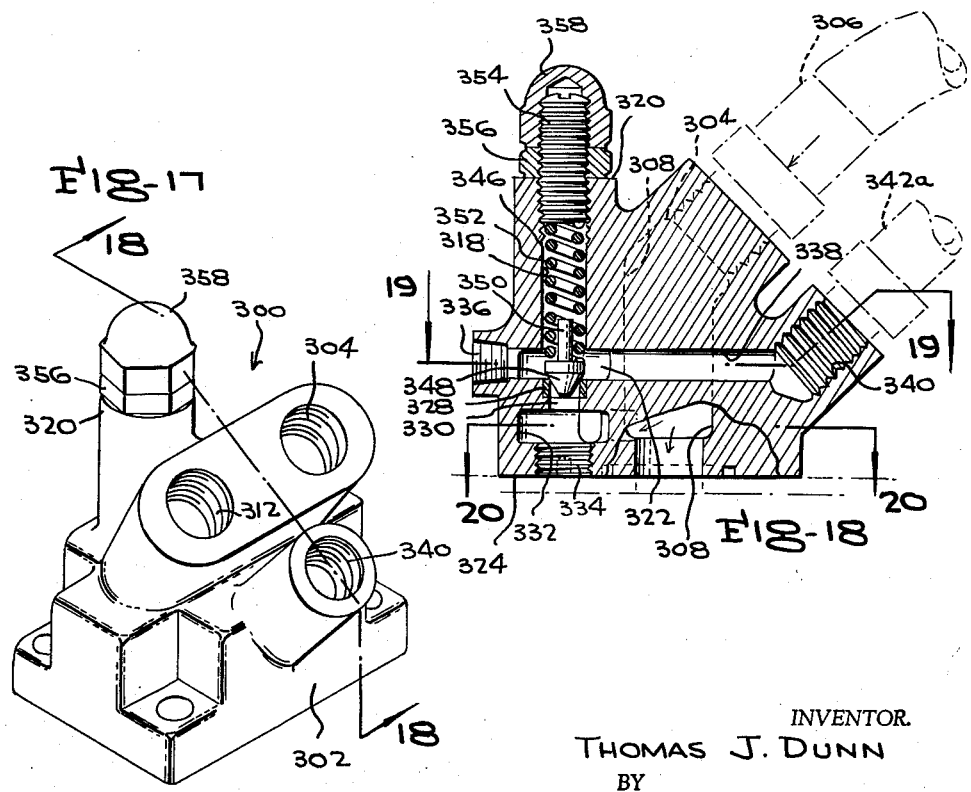

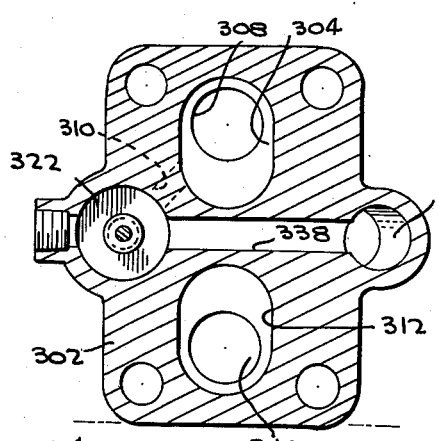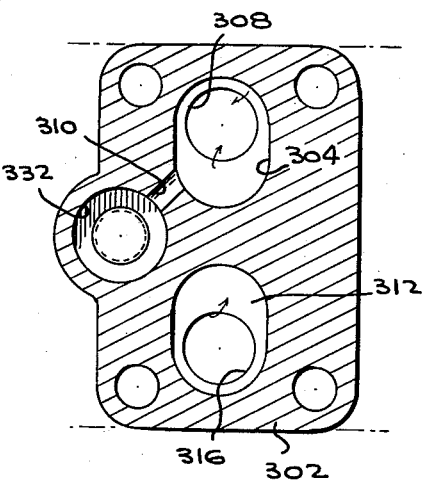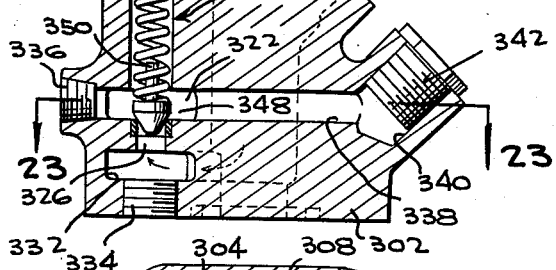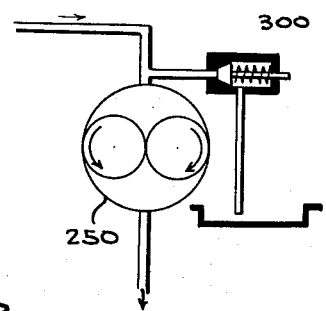
INVENTOR.
THOMAS J. DUNN

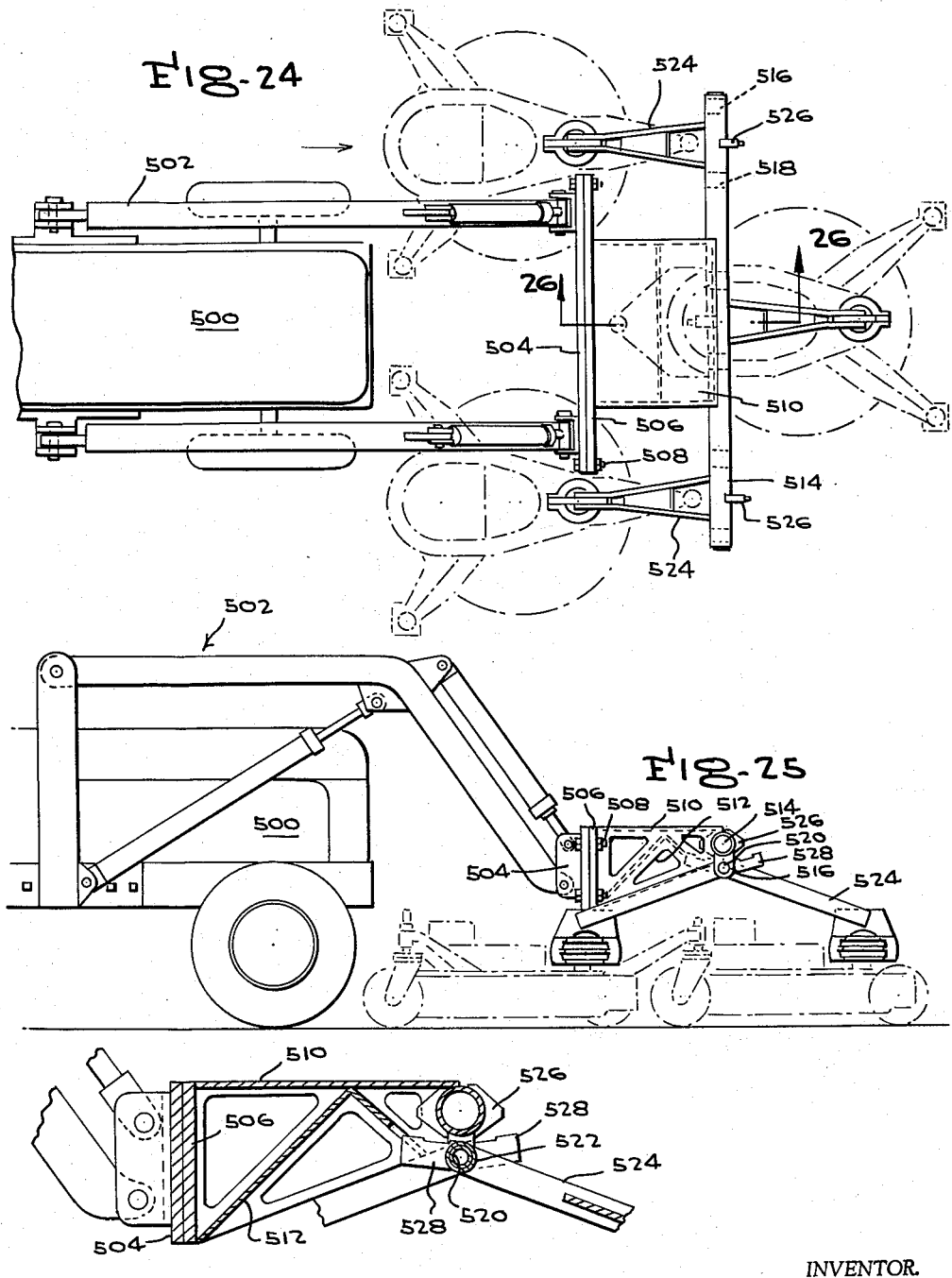

United States Patent Office 3,135,079
Patented June 2, 1964

3,135,079
MOWING APPARATUS
Thomas J. Dunn, 600 E. Valley Ave., Hackettstown, N.J.
Filed Aug. 24, 1962, Ser. No. 219,285
9 Claims. (Cl. 56—6)

The present invention relates to mowing apparatus, and more specifically, to mowers having new and novel features particularly adapting the same for heavy-duty operation for sustained periods of time such as is encountered in the mowing of highway divider strips and sidings.

An important primary object of the invention resides in the provision of heavy-duty mowing equipment, embodying one or more cutting assemblies of the rotary type, having features of construction materially reducing accidents resultant from the emission of objects from the housing, and possessing other safety features to protect the operator, other persons or objects adjacent the operating machinery, and the machine per se.

It has been previously known to supply rotary mowers actuated by hydraulic motors. In apparatus used in highway median strips and the like, obstructions of diverse character are often encountered, many times damaging the mowing equipment by reason of the failure of such devices to provide effective by-pass valve means. It is therefore among the objects of this invention to supply an impact valve assembly for use in the hydraulic system of rotary mowing apparatus which is fully effective to prevent damage to the system resultant from the encountering of obstacles by the mower.

Another important objective of the invention concerns the provision of a rotary mowing apparatus adapted for use in gangs or series. It is further within the contemplation of this invention to provide a gang-type rotary mower having terrain adjustment means to prevent "scalping" or to provide for maximum uniformity of depth of cut regardless of the contour of the terrain, said terrain adjustment means operating in universal fashion and about a horizontal axis.

It is another object of the invention to supply a hydraulic mower assembly adapted for towing by a prime mover such as a tractor with a rear mounted hitch; and additionally adapted for pushing by a prime mover having a forward mounted lift mechanism.

Yet another object of this invention centers about the provision of a particular mower housing and cutting blade unit having an inlet means adapted to exclude most non-vegetable matter such as stones, empty cans, and the like, and to harmlessly discharge any such materials which enter the unit against the ground without damage to adjacent persons or objects.

Another object of the invention is to provide a side-mounted, rotary, hydraulically powered mower, incorporating the desirable mower housing-blade arrangement described above.

Among the additional objectives of the invention is the provision of a rotary unit assembly wherein jamming or malfunction of a single unit does not affect the operation of the remaining units in the series.

Other and further objects and advantages of this invention will become apparent to those skilled in the art from a consideration of the following specification when read in conjunction with the annexed drawings, in which:

FIGURE 2 is a side elevational view of the assembly of FIGURE 1;

FIGURE 3 is an enlarged, cross-sectional view taken substantially on the section line 3—3 of FIGURE 1, looking in the direction of the arrows;

FIGURE 4 is a bottom plan view taken from the position of the line 4—4 of FIGURE 3, looking in the direction of the arrows;

FIGURE 5 is an enlarged, detail sectional view taken on the line 5—5 of FIGURE 3, looking in the direction of the arrows;

FIGURE 6 is a sectional view substantially on the scale of FIGURE 5, taken on the section line 6—6 of FIGURE 3, looking in the direction of the arrows;

FIGURE 7 is a sectional view of the device taken substantially on the line 7—7 of FIGURE 2, looking in the direction of the arrows;

FIGURE 11 is a perspective view showing a rotary mower within the scope of this invention in a side mounted location;

FIGURE 12 is a top plan view of the mower of FIGURE 11;

FIGURE 13 is a rear elevational view thereof;

FIGURE 14 is an enlarged, detail cross-sectional view, taken substantially on the section line 14—14 of FIGURE 11, looking in the direction of the arrows;

FIGURE 15 is a detail sectional view along section line 15—15 of FIGURE 14, looking in the direction of the arrows;

FIGURE 16 is a diagramatic view of an hydraulic circuit as used in the form of this invention shown in FIGURES 1-10 and 24-26;

FIGURE 17 is a perspective view of an impact valve mechanism in accordance with this invention;

FIGURE 18 is an enlarged, vertical cross-section, partially broken away, taken substantially along section line 18—18 of FIGURE 17, looking in the direction of the arrows;

FIGURE 19 is a sectional view along section line 19—19 of FIGURE 18, looking in the direction of the arrows;

FIGURE 20 is a sectional view along the section line 20—20 of FIGURE 18, looking in the direction of the arrows;

FIGURE 21 is an hydraulic diagram as employed in the mowing apparatus of FIGURES 11-15;

FIGURE 22 is a view similar to FIGURE 18 of an impact valve, but showing the impact valve as employed in a single mower unit arrangement;

FIGURE 23 is a sectional view along the section line 23—23 of FIGURE 22, looking in the direction of the arrows;

FIGURE 24 is a top plan view of the mower assembly as adapted for pushing forwardly of a prime mover;

FIGURE 25 is an enlarged side elevational view thereof; and

FIGURE 26 is an enlarged, detail sectional view along the line 26—26 of FIGURE 24, looking in the direction of the arrows.

Figure 1:
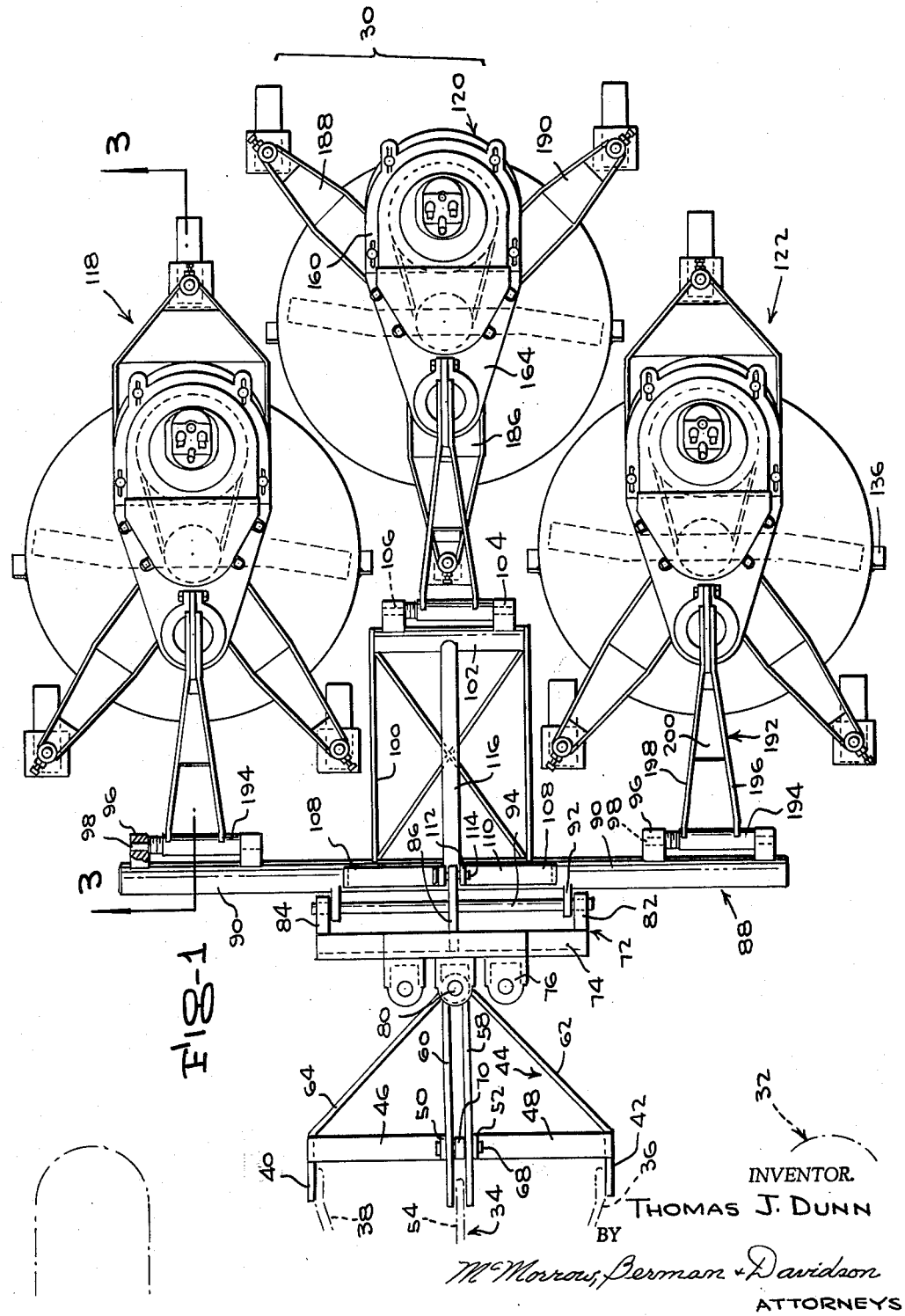
FIGURE 1 is a top plan view of a first form of mower assembly constructed and assembled in accordance with the teachings of this invention, illustrating an arrangement in which a series of units are towed by a prime mover.

The invention, as shown in the drawings, is adaptable to various mountings on prime movers of a wide variety of types, one example being behind a tractor, as in the towed, multiple arrangement of FIGURES 1-10; a side mounted arrangement of a single mower unit as in FIGURES 11-14 similar to that shown, described, and claimed in prior U.S. Patents Nos. 2,729,044 and 2,840,-974; and a novel forward mounting as disclosed in FIGURES 24-26. Adaptation of the assembly to each of these environments requires modifications, discussed in detail below, but each possesses the common features of the impact valve assembly and blade-housing configuration arrangement hereof. Further, each has novel means to maintain maximum uniformity of depth of cut regardless of terrain conditions.

Referring initially to FIGURES 1–10 of the drawings, shown therein is a multiple, gang-type rotary mowing apparatus generally designated by reference character 30. In the disclosed embodiment, three units are illustrated and are adapted for towing by prime mover 32. With specific reference to FIGURES 1, 2, and 8, it will be noted that the prime mover 32 includes a tow hitch assembly 34 capable of being raised and lowered by conventional means including laterally spaced, outwardly divergent braces 36 and 38 attached to the mover 32 at one end. Pivotally secured to each of these braces 36 and 38 are projecting ears 40, 42 of a pivot hitch means 44. The ears 40, 42 are formed integrally or otherwise fixed to leg members 46, 48 which are angled upwardly to converge and terminate in generally vertical, side-by-side end portions 50, 52. A movable control link 54 is extended from the prime mover 32 and pivotally connected at 56 to one end of a pair of arm links 58, 60 secured to the mowing hitch assembly. Also integral with and/or fixed to the ears 40, 42 are a pair of substantially horizontal braces 62, 64 which converge inwardly at their rear ends. As seen in the drawings (FIGURES 1 and 2), both the braces 62, 64 and the arm links 58, 60 are fixed as by welding to an upright, tubular sleeve 66. Intermediate their ends, the arm links 58, 60, pass between the end portions 50 and 52, and a transverse pivot pin 68 or the like is extended therebetween, said pin having a medial spacer portion 70 of enlarged diameter to separate the arm links.

Figure 8:
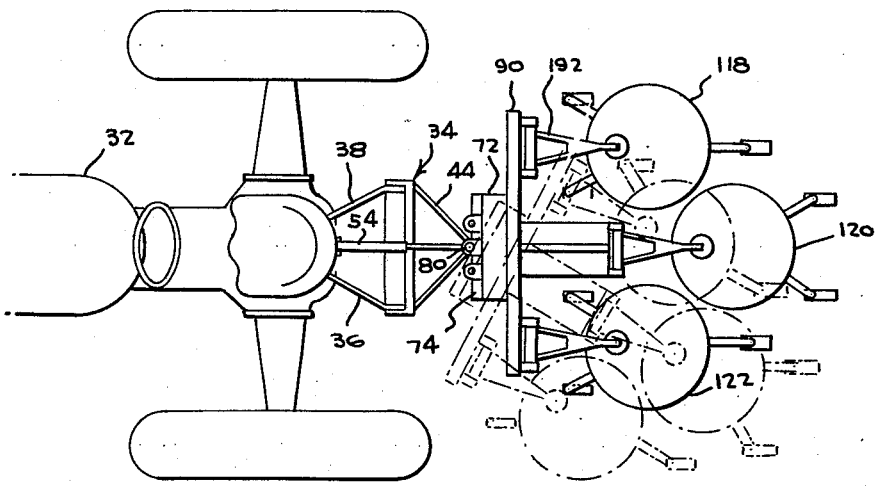
FIGURE 8 is a diagrammatic top plan view of the assembly of FIGURES 1-7 on a reduced scale, showing movements of the assembly in full and phantom lines.

A three point connection means 72 is supplied for furnishing a choice as to longitudinal alignment of the mowing assembly with respect to the prime mover 32. The connection means 72 comprises an elongated, transversely extending generally rectangular body portion 74 having a plurality (in this instance three) of pairs of vertically aligned, horizontal annular bosses 76, 78 arranged along the upper and lower edges thereof on one side. The space between the bosses of each pair is such that the sleeve 66 is insertable therebetween, the opening therein being aligned vertically with the openings in the bosses. In this location, that is, with the openings in substantially vertical alignment, a swivel pin 80 is inserted therethrough whereby the tow hitch assembly 34 is secured to the connection means 72 for lateral swinging movement, as shown in FIGURE 8. If it is desired to limit the swinging movement, the central pair of bosses is used to accommodate the sleeve 66, and additional pins 80 are inserted in the remaining pairs of bosses. Thus, these additional pins will abut against the braces 62, 64 to limit the swinging of the unit.

The opposite side of the body portion 74 along its lower edge has a pair of laterally spaced rearwardly directed, vertical bosses 82, 84, and an elongated lift arm 86 best seen in FIGURES 1 and 2 extends upwardly and rearwardly from the upper edge thereof. The rearward extent of the lift arm 86 is greater than that of the bosses 82 and 84, the purpose of which appears below.

The connection means 72, in turn, is demountably attached to the mower assembly lift and drag mechanism 88, which includes as its main structural element an elongated transverse tubular hitch bar 90. On the forward side of the bar 90 are located a plurality of projecting, apertured, vertical lugs 92 contained in a group of a length less than the distance between the bosses 82 and 84 and adapted for co-alignment therewith. An elongated pin means 94 is extended therethrough whereby the bar 90 is secured to the connection means 72. On the rear side of the bar 90 are a plurality of pairs of clevises 96—in this case where three units are to be used, two of such pairs 96 being employed—arranged adjacent the outer ends of the bar. Extending between the clevises of each pair 96 is a cylindrical rod 98. Interposed between the pairs of clevises 96, and projecting rearwardly from the bar 90, is an elongated, central bracket frame 100 which may be of any desired form to include an outer cross-member 102 generally parallel to the bar 90. The cross-member 102 has a pair of clevises 104 thereon having rod 106 therebetween similar to clevises 96 and rod 98. Affixed as by welding to the bar 90 at a radius thereof generally perpendicular to the lugs 92 and the pairs of clevises 96 are a pair of L-shaped hangers 108 each having a foot portion 110 fixedly secured along the bar 90 and an upstanding leg portion 112. The leg portion 112 of the hangers are closely spaced and have coaxial apertures therein aligned with an aperture in the lift arm 86 of the connection means 72. A pivot pin 114 is extended through said apertures. Fixing the rod 106 for vertical movement with the rods 98 is an angularly disposed brace element 116 rigidly secured between the leg portions 112 at one end and fixed to the outer cross member 102 of the frame 100 at its other end.

From the foregoing, it will be seen that a hook-up means to a tractor or other prime mover 32 is defined which permits the entire assembly as described hereinbefore to be lifted or lowered. Lifting is accomplished through the conventional action of the hitch assembly 34, but the unit is normally freely pivotal in a horizontal plane about the vertical swivel pin 80.

The multiple arrangement of FIGURES 1–10 includes three rotary mowers 118, 120 and 122 arranged in series, and mounted for overlapping in cutting area, the mowers 118 and 122, the outer units, being identical to one another, and hence, a single description is applicable to both. The central unit 120 is quite similar differing only in its wheel arrangement, as will appear below, and only the differences will be described to avoid repetition.

Referring to FIGURES 1, 3 and 4, it will be seen that the mower units 118 and 122 each comprises a housing 124 having a generally discoidal, flat top deck 126 having a substantially rectangular rear extension 128. An annular, depending side wall 130 extends about the circular portion of the periphery of the deck 126, and includes a leading portion or entrance portion 132 and a trailing portion 134 which is of greater depth than said entrance portion. Angularly mounted, rigidifying plates 136 project outwardly from the side wall 130 at the junctions of said entrance and trailing portions on each side of the housing. A discharge housing 138 is fixed to the main housing, and includes a top wall 140 secured to the rear extension 128 of the housing deck, side walls 142, 144, and an outwardly and downwardly flared rear wall 146.

The deck 126 has a central opening 148 formed therein, and a tubular blade rotation means collar 150 is fixed as by welding to depend into the housing about said opening. A generally rectangular forward divider plate 152 is welded in the interior of the mower housing forwardly of the rotation means collar 150, and a rear divider plate 154 is fixed in the housing diametrically opposite thereto. The plate 154 has a shallow forward portion 156 and a deep rear portion 158 and extends across the main housing fully to but not including the discharge housing 138. The shape of the rear divider plate 154 is for coaction with the mower blade, as described in more detail below.

Fixed to the upper side of the deck 126 is a flat, generally elongated wheel mounting plate 160 which is tapered from its rear portion 162 toward its forward portion 164. On the opposite sides of the forward portion 164 are fixed a pair of wheel mounting brackets 166 (which are also welded to the deck 126) which extend upwardly and outwardly and terminate in horizontal portions 168 generally parallel to the plate 160, the brackets and their horizontal portions having upwardly projecting, strengthening flanges along their side edges. The rear portion 162 of the plate 160 extends over the discharge housing 138, and an upwardly and outwardly extending wheel mounting bracket 170, terminating in horizontal portion 172, is fixed thereto. Thus, as seen in FIGURES 1 and 4, each mower unit 118 and 122 has a pair of forward wheel brackets 166 and a trailing wheel bracket 170. The respective horizontal portions 168 and 172 each has secured thereto a sleeve 174 having a boss 176 on one side thereof, the boss having a threaded, horizontal aperture formed therein receiving a set screw 178. Through each sleeve 174 is extended a substantially cylindrical, vertical spindle 180 having a plurality of recesses 182 arranged in a vertical column on one side to receive the inner end of the set screw 178. The spindle 180 is fixed to a castor wheel assembly 184. As seen in FIGURE 3, the arrangement is such that selective height adjustment of the mower housing is provided by the selection of location of the set screw 178 in the recesses 182 of the spindles 180.

The intermediate mower unit 120 is identical in construction and assembly to the outer units 118 and 122, except that a forward wheel mounting bracket 186 extends from the forward portion 164 of the plate 160 thereof, and a pair of side wheel mounting brackets 188 and 190 extend outwardly and rearwardly from an intermediate location along said plate 160. The brackets 186, 188 and 190 each carry a sleeve and castor wheel assembly as previously described.

Figure 9:
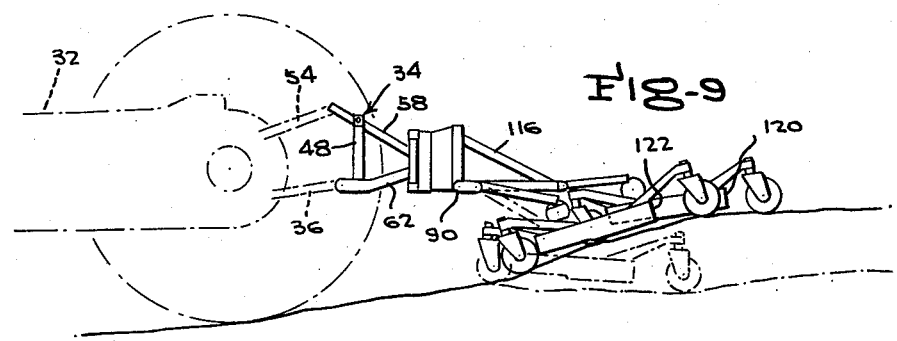
FIGURE 9 is a side view illustrating movement over uneven terrain.
Figure 10:
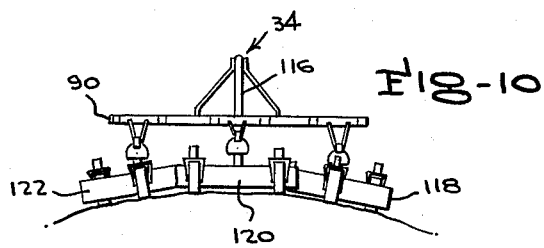
FIGURE 10 is a rear elevational view illustrating such movement.

As will appear below in the description of operation, the multi-unit arrangement of FIGURES 1–10 is adapted for automatic terrain adjustment to maintain maximum uniformity of depth of cut, even over relatively uneven ground. This is accomplished, in large part, by the provision of novel means 192 for connection of the individual mower units 118, 120, 122 to the lift and drag mechanism 88. The means 192 (the same for all units) include a two-piece trunnion 194 journaled about the rod 98 or 106. Trunnions 194 comprise threaded, telescoping sleeves to take up end play between clevises 96 or 104. Fixed to each trunnion 194 are a pair of connector arms 196, 198 which are rearwardly converging and permanently joined by a spacer plate 200. A vertical tubular standard 202 is fixed to each unit as by welding adjacent the forward edge of the portion 162 of the plate 160 and has a pair of horizontal openings in diametrically opposite sides thereof through which is received a locking pin 204. This pin 204 also passes through openings in a ball means 206 having a vertical bore 208 therein to receive the standard 202. Bore 208 is open at its upper end to permit welds 210 permanently securing it in place on said standard. In FIGURES 3 and 5, it is seen that the pin 204 includes end portions extending outwardly on each side of the ball 206. Socket means 212 for receiving the ball 206 comprises a pair of elements 214, 214 each having a spherically curved portion 216 and vertical flanges 218, 220 apertured to receive a plurality of bolt and nut connections 222. In order to fit the elements 214 about the ball 206, and yet to provide limiting guideways for the pin 204 the spherically curved portions are of less than semi-spherical shape, and vertically arcuate spacer blocks 224, also apertured for the connections 222, position same together about the balls. These spacer blocks are formed as integral, depending fingers on an upstanding connection block 226 which is secured between the connector arms 196 and 198. Thus, as illustrated in FIGURES 6, 9 and 10, each unit is mounted for limited rocking movement as dictated by terrain around either a longitudinal or transverse axis, but is restrained from any rotary movement around a vertical axis.

FIGURES 9 and 10 illustrate the manner in which the multiple unit adapts to the cutting of non-level terrain, the individual units acting in response to the contour of the terrain. Thus, scalping or uneven cutting is positively prevented.

Each unit 118, 120 and 122 is provided with a blade 228 which includes a substantially rectangular central portion 230 having a plurality of connection apertures therein. On each side of the central portion is an outwardly and downwardly angled part 232, 234, said angled parts being oppositely inclined in their angular planes. Integral with each angled part are outer cutting parts 236, 238, respectively, which are inclined upwardly from front to rear (that is, in the direction of cut) and offset forwardly from the plane of the central portion 230. Viewed from the side as in FIGURE 3, it is seen that the upper outline shape of the blade 228 conforms with the shape of the lower edges of the divider plate 154. The inclinations of the various portions of the blade are such that, when the blade is rotated rapidly as occurs in use, an upward current of air is formed propeller fashion tending to draw vegetable matter upwardly into the forward portion of the mower housing. Also, a rotary current of air is effected above the blade whereby material severed by the blade is moved in the direction of rotation until it reaches the divider plate 154. Upon impingement on said plate the severed material is exhausted outwardly and downwardly through the discharge opening. Any non-vegetable matter, such as cans, broken glass, or the like, is expelled harmlessly against the ground by reason of the shape of said exhaust housing.

The drive unit for the blade 228 comprises a shaft 240 having a depending cross piece 242 to which the central portion of the blade is fixed by bolt means. The shaft is mounted in a bearing sleeve 244 and keyed to a multiple pulley wheel 246 about said bearing sleeve above the deck 126. A suitable cover 248 is provided on the deck to prevent fouling by foreign matter. A conventional fluid drive motor 250 is provided and is mounted above a cover 252 for a drive pulley wheel 254. The drive shaft 256 of the fluid motor extends into said cover and is secured to wheel 254. Belts 258 are trained about the pulley wheels 246 and 254 and transmit rotary movement therebetween.

In each form of this invention, a novel impact valve arrangement is employed which positively prevents damage to the cutting machinery or its drive even if a foreign object suddenly stops the operation of the blade. The valve is generally designated by reference character 300. The construction of the valve 300 includes a substantially solid valve body 302 having an inlet opening 304 threaded to receive a fluid supply hose 306 carrying fluid from a pump source 301 shown schematically in FIGURE 16. The inlet opening 304 is inclined from the horizontal and is in communication with a vertical inlet passageway 308 leading into the fluid motor 250. As shown in FIGURE 20, an emergency horizontal by-pass channel 310 extends from one side of the opening 304 to a chamber 332. The valve body 302 also has an inclined outlet opening 312 for attachent of outlet hose 314, the opening 312 communicating with a vertical relief passageway 316 for the motor 250.

In order to provide for the by-passing of a jammed motor, the body 302 has an elongated vertical opening 318 (FIGURES 18 and 22) therein extending from the top 320 of the body and opening into a circular chamber 322 intermediate the top 320 and bottom 324 thereof. Chamber 322 occupies a horizontal plane above the channel 310. Beneath the chamber 322 and coaxial therewith is a valve seat opening 326 into which is fitted a seat 328, and the opening 326 communicates with a short opening 330 leading to the second chamber 332 in the same horizontal plane as the channel 310. A plug 334 seals the chamber 332 at its bottom and provides for necessary access for cleaning or repair. Plug 336 provides such ccess to the chamber 322.

A transverse relief passageway 338 extends through the body 302, opening on the chamber 322 at one end, and on an inclined chamber 340 at its other end. Chamber 340 is either plugged at 342 as in FIGURE 22, or provided with a hose 342a leading to a by-pass reservoir as shown in dotted view in FIGURE 18, depending upon whether used in a series arrangement (FIGURE 16)

or alone (FIGURE 21). In any event, there is provided a passage 344 between the passageway 338 and the outlet opening 312.

A valve nipple assembly 346 is provided and assumes the position shown in FIGURES 18 and 22. Assembly 346 includes nipple element 348 which rests on the seat 328, an extension 350, a coil spring 352 urging the nipple 348 against the seat 328, and tension adjustment screw 354 threadedly engaging the opening 318. Lock nut 356 and cap nut 358 complete the tension adjustment and retaining means for the nipple assembly 346.

In normal functioning, the flow is merely into the opening 304, through the passageway 308 and thence into the motor 250. Return flow is through the relief passageway 316, the outlet opening 312 and thence to the next motor or the reservoir. However, should motor 250 be forceably halted or prevented from turning, for example, by material being jammed between the blade and the bottom edge of divider plate 154, pressure build-up in the passageway 308 and channel 310 is transmitted through the chamber 332 through the short opening 330 thereby raising the nipple 348 from its seat and permitting fluid to enter the chambr 322 from which it is vented through the transverse passageway 338 either through the passage 344 (FIGURE 23) and out the opening 312, or through the passageway 338 and out a hose 342a (FIGURE 18). In either case, damage to the motor 250 is prevented, and in multiple arrangements, the operation of the remaining upstream units in a series is unaffected by stoppage of any one or more thereof, as will be seen in FIGURE 16.

A single, side mounted unit of mowing apparatus is illustrated in FIGURES 11–15 inclusive, and employs a mount somewhat similar to that shown in the prior U.S. patents mentioned above, Nos. 2,729,044 and 2,840,974.

The side mounted unit, generally designated by reference numeral 400 includes a mower unit 402 identical with the units 118, 120 and 122 previously described, in all respects except for the wheel mount arrangement. In the case of the unit 402, a forward wheel mounting arm 404 including arms 406, 408 is secured by welding to the upper side of the housing deck, and a rear wheel unit 410 extends from the wheel mounting plate 164.

In FIGURES 12 and 13, the tractor side frame is identified by reference numeral 412. Bolted or otherwise fixed to the frame 412 is a control and mounting frame 414 carrying control handles 416 on its upper end, and having depending ears 418 with an axle 420 journaled therebetween. A sleeve 422 is rotatably mounted on the axle 420 and has an outward link 424 welded thereto. The sleeve link 424 has a pair of side-by-side connection ears 426, 428 fixed to its outer end, and an upstanding limit lug 430 to prevent upward rotation past a predetermined point. Depending from one of the ears 418 and fixed thereto is a bracket 432 to which is fixed one end of an extensible hydraulic cylinder 434. The other end of cylinder 434 is pivotally connected to a bracket 436 on the link 424. Thus, it will be seen that rotational movement of the sleeve 422 about the axle 420 is controlled by extension and retraction of said cylinder 434. One of the handles 416 is the control for said cylinder.

The ears 428 and 426 are connected by a pin 437 pivotally to an upstanding element 438 of a break-away hinge assembly 440, as described in said prior patents. The hinge 440 has an inwardly depending link piece 442 secured pivotally to one end of a second hydraulic cylinder 444—the other end of which is fixed to the frame 414 whereby extension thereof pivots the hinge 440 vertically about the pin 437.

As seen from the foregoing, the entire unit is raised by actuation of the cylinder 434, and the hinge and its associated parts tilted with respect to the frame 414 by actuation of the cylinder 444.

The hinge 440 (FIGURE 14) includes an outwardly projecting arm 446 having a rebent outer end 448 which terminates in a sleeve 450. Sleeve carries pin 452 and a plate 453 depends from said arm.

Means for connection of the break-away hinge 440 to the mower unit 402 includes a connection assembly 454 having a plurality of arms 456, 458 and 460 welded to the mower deck. The arms are interconnected at one end by a base plate 462. Arising from the base plate 462 between the arms 456 and 458 is a swivel plate 464 having an arcuate slot 466 which receives the pin 452. As shown in FIGURE 14, this permits limited movement around the axis of an axle 472 of the assembly 454 relative to the arm 446 and plate 453. FIGURE 15 illustrates the further connection of the assembly 454 to the hinge 440, including a pair of spaced apart lugs 468, 470 extending upwardly from plate 462 between the arms 458 and 460 and supporting the axle 472 therebetween. A sleeve 474 fixed to a bracket 476 comprising a fixed extension on the hinge 440 receives the axle 472, and thereby completes this connection.

Thus, the unit 402 may be raised and lowered from the ground, may be pivoted horizontally about the break-away hinge, or may be tilted for a mowing operation in other than in horizontal position.

In FIGURES 24–26, the means for forward mounting of a multiple arrangement of cutting units is shown. The units per se are those described above in reference to FIGURES 1–10, and hence, only the mount is shown in full lines in the former figures and hereinafter described.

The prime mover 500 has a conventional boom and lift 502 terminating in a transverse forward plate 504. An elongated, generally rectangular push plate 506 is detachably secured to the plate 504 along the full length thereof, as by bolts 508. A rectangular extension plate 510 is fixed centrally to the plate 506, and includes depending, rigidifying brace means 512. Fixed to the forward end of the plate 510 and its brace 512 is an elongated transverse tubular push bar 514, having a plurality of pairs of depending lugs 516, 518, each having an axle 520 therebetween. These axles 520 are passed through sleeves 522 on the proximal ends of mower connection arms 524 extended thereto from each of the mower units (preferably arranged as shown in FIGURE 24).

Since the sleeves 522 are rotatable on the axles 520, to provide for pivotal mounting of the arms with respect to the bar 514, and in view of the fact that it is desired to utilize the lift arrangement of the prime mover to remove the units from terrain contact for movement from one location to another, rotation limit means are provided. Such means comprise substantially triangular stop lugs 526 welded to the bar 514 on the side thereof opposite the main direction of extension of the connection arms 524. Coacting wth the stop lugs 526, are aligned extensions 528 projecting outwardly from the appropriate side of each sleeve 520. These sleeve extensions abut the stop lugs 526 as the sleeves rotate, thereby effectively limiting rotational movement.

Having described and illustrated the various embodiments of the invention, wherein each embodiment employs a mower housing and blade arrangement having the desired objectives set forth above, and an impact valve arrangement positively preventing damage to the unit resulting from forceable stoppage of a blade, it will be understood that these descriptions and illustrations are offered merely by way of example, and that the invention is to be limited only by the scope of the appended claims.

What is claimed is:

1. A rotary mower comprising a mower housing including an upper deck, a depending peripheral wall secured to said deck, said peripheral wall having a discharge opening therein, respective forward and rear depending longitudinally extending vertical divider plates in said housing secured to said upper deck, a blade rotatably mounted in the housing below and closely adjacent the divider plates, means for rotating the blade, said divider plates extending on opposite sides of the axis of rotation of said blade and being in the same plane therewith, and a discharge housing secured to the mower housing around said discharge opening, said discharge housing having a rear wall and side walls arranged such that all discharge therefrom is directed downwardly against the ground.

2. A rotary mower comprising a mower housing including an upper deck and having a depending peripheral wall provided with a discharge opening, diametrically longitudinally extending front and rear vertical divider plates in said housing secured to and depending from said upper deck, said rear divider plate extending adjacent said discharge opening and being spaced from said peripheral wall opposite said discharge opening, a blade rotatably mounted in the housing below and closely adjacent said divider plates, said divider plates extending on opposite sides of the axis of rotation of said blade and being in the same plane therewith; a hydraulic motor mounted on the housing, said motor having fluid inlet and outlet conduit means, means drivingly connecting said motor to said blade, and hydraulic fluid supply conduit means connected to said inlet conduit means.

3. A rotary mower comprising a mower housing including an upper deck and having a depending peripheral wall provided with a discharge opening, diametrically longitudinally extending front and rear vertical divider plates in said housing secured to and depending from said upper deck, said rear divider plate extending adjacent said discharge opening and being spaced from said peripheral wall opposite said discharge opening, a blade rotatably mounted in the housing below and closely adjacent said divider plates, said divider plates extending on opposite sides of the axis of rotation of said blade and being in the same plane therewith, said blade having an inclined outer propeller portion producing an upward air current responsive to rotation of the blade, said air current tending to draw material upwardly into the forward portion of the mower housing and to move the material in the direction of rotation of the blade and to blow the material against said rear divider plate, the material being exhausted rearwardly through the discharge opening, a hydraulic motor mounted on the housing, said motor having fluid inlet and outlet conduit means, means drivingly connecting said motor to said blade, and hydraulic fluid supply conduit means connected to said inlet conduit means.

4. A rotary mower comprising a mower housing including an upper deck and having a depending peripheral wall provided with a discharge opening, diametrically longitudinally extending front and rear vertical divider plates in said housing secured to and depending from said upper deck, said rear divider plate extendibng adjacent said discharge opening and being spaced from said peripheral wall opposite said discharge opening, a downwardly and outwardly directed discharge housing secured to said mower housing in communication with said discharge opening, a blade rotatably mounted in the housing below and closely adjacent said divider plates, said divider plates extending on opposite sides of the axis of rotation of said blade and being in the same plane therewith, a hydraulic motor mounted on the housing, said mower having fluid inlet and outlet conduit means, means drivingly connecting said motor to said blade, and hydraulic fluid supply conduit means connected to said inlet conduit means.

5. A rotary mower comprising a mower housing including an upper deck and having a depending peripheral wall provided with a discharge opening, diametrically longitudinally extending front and rear vertical divider plates in said housing secured to and depending from said upper deck, said rear divider plate extending adjacent said discharge opening and being spaced from said peripheral wall opposite said discharge opening, a downwardly and outwardly directed discharge housing secured to said mower housing in communication with said discharge opening, a blade rotatably mounted in the housing below and closely adjacent said divider plates, said divider plates extending on opposite sides of the axis of rotation of said blade and being in the same plane therewith, said blade having an inclined outer propeller portion producing an upward air current responsive to rotation of the blade, said air current tending to draw material upwardly into the forward portion of the mower housing and to move the material in the direction of rotation of the blade and to blow the material against said rear divider plate, the material being exhausted rearwardly through said discharge opening, a hydraulic motor mounted on the housing, said motor having fluid inlet and outlet conduit means, means drivingly connecting said motor to said blade, and hydraulic fluid supply conduit means connected to said inlet conduit means.

6. A rotary mower comprising a mower housing including an upper deck and having a depending peripheral wall provided with a discharge opening, diametrically longitudinally extending front and rear vertical divider plates in said housing secured to and depending from said upper deck, said rear divider plate extending adjacent said discharge opening and being spaced from said peripheral wall opposite said discharge opening, a blade rotatably mounted in the housing below and closely adjacent said divider plates, said divider plates extending on opposite sides of the axis of rotation of said blade and being in the same plane therewith, said blade having downwardly offset inclined outer propeller portions producing an upward air current responsive to rotation of the blade, said rear divider plate being increased in height adjacent said discharge opening so that its bottom edge contour conforms generally with the offset shape of the blade, said air current tending to draw material upwardly into the forward portion of the mower housing and to move the material in the direction of rotation of the blade and to project the material against the rear divider plate and blow the material through said discharge opening, a hydraulic motor mounted on the housing, said motor having fluid inlet and outlet conduit means, means drivingly connecting said motor to said blade, and hydraulic fluid supply conduit means connected to said inlet conduit means.

7. A rotary mower comprising a mower housing including an upper deck and having a depending peripheral wall provided with a discharge opening, diametrically longitudinally extending front and rear vertical divider plates in said housing secured to and depending from said upper deck, said rear divider plate extending adjacent said discharge opening and being spaced from said peripheral wall opposite said discharge opening, a downwardly and outwardly directed discharge housing secured to said mower housing in communication with said discharge opening, a blade rotatably mounted in the housing below and closely adjacent said divider plates, said divider plates extending on opposite sides of the axis of rotation of said blade and being in the same plane therewith, said blade having downwardly offset inclined outer propeller portions producing an upward air current responsive to rotation of the blade, said rear divider plate being increased in height adjacent said discharge opening so that its bottom edge contour conforms generally with the offset shape of the blade, said air current tending to draw material upwardly into the forward portion of the mower housing and to move the material in the direction of rotation of the blade and to project the material against the rear divider plate and blow the material through said discharge opening, a hydraulic motor mounted on the housing, said motor having fluid inlet and outlet conduit means, means drivingly connecting said motor to said blade, and hydraulic fluid supply conduit means connected to said inlet conduit means.

8. A mowing apparatus comprising a plurality of mowing units, means to connect said mowing units to a common prime mover, each mowing unit comprising a mower housing including an upper deck, a depending peripheral wall secured to said deck, said wall having a discharge opening therein, a blade rotatably mounted in said mower housing, a longitudinally extending vertical divider plate in said mower housing secured to and depending from said upper deck, the bottom edge of the divider plate extending closely adjacent the path of movement of said blade, said divider plate being in the plane of the axis of rotation of the blade and terminating adjacent said discharge opening, a hydraulic motor mounted on said housing, means drivingly connecting said motor to said blade, a single hydraulic pump, conduit means connecting the hydraulic motors in series to said pump, whereby to circulate hydraulic fluid through the motors, respective normally closed by-pass valves connected across the hydraulic motors, and means opening the valves responsive to the building up of fluid pressure at the input sides of the motors caused by restraint against rotation of the blades, whereby to allow the hydraulic fluid to by-pass the motors.

9. Mowing apparatus including a plurality of rotary mowers, means to connect the mowers to a prime mover, each mower comprising a mower housing, longitudinally extending divider means in the housing, a blade rotatably mounted in the housing adjacent the divider means, the divider means extending on opposite sides of the axis of rotation of the blade, means for rotating the blades, including at least one hydraulic motor having an input side, a discharge housing secured to the mower housing, having walls arranged such that all discharge therefrom is directed downwardly against the ground, means drivingly connecting the motor to the blade of each mower, a single hydraulic pump, conduit means connecting the pump in series with the motor of each mower to circulate hydraulic fluid through the motors, a normally closed relief valve connected acros a portion of the conduit means including at least one of the motors, and means opening the valve responsive to fluid pressure build-up on the input side of the one motor.

References Cited in the file of this patent
UNITED STATES PATENTS

| | | |
|---|---|---|
| 2,743,567 | Martin | May 1, 1956 |
| 2,763,116 | Flinchbaugh et al. | Sept. 18, 1956 |
| 2,920,434 | Ingram | Jan. 12, 1960 |
| 2,928,423 | Rockwell | Mar. 15, 1960 |
| 2,982,080 | Martin | May 2, 1961 |
| 2,990,666 | Blume | July 4, 1961 |
| 3,037,341 | Collins | June 5, 1962 |
| 3,058,280 | Lewis | Oct. 16, 1962 |